(12) United States Patent
Liang (10) Patent No.: US 11,796,320 B2
(45) Date of Patent: Oct. 24, 2023

(54) POSITIONING METHOD, APPARATUS AND DEVICE, AND COMPUTER-READABLE STORAGE MEDIUM

(71) Applicant: TENCENT TECHNOLOGY (SHENZHEN) COMPANY LIMITED, Guangdong (CN)

(72) Inventor: Qiaozhong Liang, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 577 days.

(21) Appl. No.: 17/075,880

(22) Filed: Oct. 21, 2020

(65) Prior Publication Data

US 2021/0033738 A1 Feb. 4, 2021

Related U.S. Application Data

(63) Continuation of application No. PCT/CN2019/103662, filed on Aug. 30, 2019.

(30) Foreign Application Priority Data

Sep. 4, 2018 (CN) .......................... 201811025588.0

(51) Int. Cl.
*G01C 21/18* (2006.01)
*G01C 21/16* (2006.01)
(Continued)

(52) U.S. Cl.
CPC .......... *G01C 21/165* (2013.01); *G01C 21/18* (2013.01); *G01S 19/30* (2013.01); *G01S 19/49* (2013.01);
(Continued)

(58) Field of Classification Search
CPC .......... G01S 19/30; G01S 19/53; G01S 19/49; G01S 19/47; G01S 17/66; G01S 17/86;
(Continued)

(56) References Cited

U.S. PATENT DOCUMENTS 6,240,367 B1 * 5/2001 Lin .................. G01C 21/28
701/472
9,836,056 B2 * 12/2017 Ansari .................... G06T 17/00
(Continued)

FOREIGN PATENT DOCUMENTS

CN 1908587 A 2/2007
CN 102778686 A 11/2012
(Continued)

OTHER PUBLICATIONS

Skog et al., In-Car Positioning and Navigation Technologies—A Survey, 2009, IEEE, p. 4-21 (Year: 2009).*
(Continued)

*Primary Examiner* — McDieunel Marc
(74) *Attorney, Agent, or Firm* — Sughrue Mion, PLLC (57) ABSTRACT

A positioning method, apparatus, device, and a computer storage medium are provided. The method includes: obtaining update information of an object, the update information including GPS positioning information and dead reckoning position information, the dead reckoning position information being determined according to attitude change information of the object measured by an inertial measurement unit (IMU); determining a fusion positioning model matching the update information, the fusion positioning model being used for performing fusion positioning using the update information; determining error information of the update information, the error information indicating error conditions of the update information; and performing the fusion positioning on the GPS positioning information and
(Continued)

the dead reckoning position information of the update information according to the fusion positioning model with the error information to obtain a current position of the object.

20 Claims, 4 Drawing Sheets (51) Int. Cl.
| | | |
|---|---|---|
| *G01S 19/30* | (2010.01) | |
| *G01S 19/49* | (2010.01) | |
| *G01S 19/53* | (2010.01) | |
| *G06F 18/214* | (2023.01) | |
| *G06F 18/25* | (2023.01) | |

(52) U.S. Cl.
CPC ............ *G01S 19/53* (2013.01); *G06F 18/214* (2023.01); *G06F 18/251* (2023.01)

(58) Field of Classification Search
CPC .......... G01S 17/89; G01S 19/18; G01S 19/21; G01S 19/48; G06F 18/251; G06F 18/214; G01C 21/165; G01C 21/18; G01C 21/16; G01C 25/005; G01C 25/00; F42B 15/01; F42B 30/10; F42B 10/64; F42B 10/663; F42B 10/668; F42B 10/02; F41G 7/346; F41G 7/36; F41G 3/145; G01B 11/25; G01B 11/2545; G03B 15/006; G05D 1/0094; G05D 1/12; G05D 1/107; G06K 9/00671; H04N 13/239; H04N 5/23254; H04N 5/23267; G06T 7/20

See application file for complete search history.

(56) References Cited

U.S. PATENT DOCUMENTS

| | | | | |
|---|---|---|---|---|
| 10,571,925 | B1* | 2/2020 | Zhang | ................ G01C 21/1656 |
| 10,571,926 | B1* | 2/2020 | Zhang | ................ G05D 1/0274 |
| 11,099,558 | B2* | 8/2021 | Huang | ................... G06T 17/05 |
| 2015/0142311 | A1 | 5/2015 | Sun et al. | |
| 2017/0089705 | A1 | 3/2017 | Steinhardt et al. | |
| 2019/0250622 | A1* | 8/2019 | Nister | ............... B60W 60/0027 |
| 2019/0320061 | A1* | 10/2019 | Salandy-Defour | ... H04W 4/025 |

FOREIGN PATENT DOCUMENTS

| | | |
|---|---|---|
| CN | 101907714 B | 4/2013 |
| CN | 104502942 A | 4/2015 |
| CN | 104819716 A | 8/2015 |
| CN | 108303721 A | 7/2018 |

OTHER PUBLICATIONS

Khalaf-Allah, Tracking mobile terminals in wireless networks, 2007, IEEE, p. 46-49 (Year: 2007).*
Bernoulli et al., Improvement of inertial sensor based indoor navigation by video content analysis, 2011, IEEE, p. 1-9 (Year: 2011).*
Khalaf-Allah, Position tracking and global localization of mobile terminals in cellular networks, 2007, IEEE, p. 1-5 (Year: 2007).*
Hui et al., "Adaptive Algorithm for Multisensor Track Fusion with Feedback Architecture", Chinese Journal of Computers, 2006, vol. 29, No. 12, pp. 2232-2237.
International search report for PCT/CN2019/103662 dated Dec. 4, 2019.
Extended European Search Report dated Oct. 6, 2021 by the European Patent Office in application No. 19857105.1.
Written Opinion dated Dec. 4, 2019 from the International Bureau in International Application No. PCT/CN2019/103662.
Communication dated Dec. 1, 2021 from the China National Intellectual Property Administration in Chinese Application No. 201811025588.0.
Yuan Quan et al., "Adaptive fusion algorithm based on wavelet neural networks for multisensor measurement", Journal of Beijing University of Aeronautics and Astronautics, 2008, vol. 34, No. 11, pp. 1331-1334 (4 pages total).

* cited by examiner

POSITIONING METHOD, APPARATUS AND DEVICE, AND COMPUTER-READABLE STORAGE MEDIUM

CROSS-REFERENCE TO RELATED APPLICATION(S)

This application is a continuation of PCT/CN2019/103662, filed on Aug. 30, 2019, which claims priority to Chinese Patent Application No. 201811025588.0, entitled "POSITIONING METHOD, POSITIONING APPARATUS, POSITIONING DEVICE, AND COMPUTER STORAGE MEDIUM," filed with the China National Intellectual Property Administration on Sep. 4, 2018, the disclosures of which are incorporated by reference herein in their entireties.

FIELD

Embodiments of the disclosure relate to the field of computer technologies, and in particular, to a positioning method, apparatus, and device, and a readable storage medium.

BACKGROUND

In the field of in-vehicle navigation, Global Positioning System (GPS) is used as a basic reference element of positioning. GPS is characterized by relatively high precision in a long time, but has a problem of inaccuracy in some cases. For example, in an area such as an urban road having high-rise buildings, a problem of signal drift appears because of factors such as geographic obstruction and weather. In an area such as an underground parking lot or a field tunnel, a GPS signal may be unavailable. In these cases, the in-vehicle navigation that performs positioning and navigation based on the GPS signal may be affected and cause inaccurate positioning to occur.

In order to address the above identified problems, an inertial measurement unit is usually used as an auxiliary element of GPS positioning. In a case that the GPS signal is available, GPS information is used as a basic element of positioning, while in a case that the GPS signal is weak or there is no GPS signal, information about the inertial measurement unit is used as the basic element of positioning. However, a signal threshold for switching from the GPS signal to inertial measurements may not be set precisely and cause inaccurate positioning results. Therefore, the accuracy of positioning precision may be degraded.

SUMMARY

Embodiments of the disclosure provide a positioning method, apparatus, and device, and a readable storage medium, to improve the accuracy of positioning and provide other improvements.

According to an embodiment, there is provided a positioning method, performed by a terminal, the method includes: obtaining update information of an object, the update information including GPS positioning information and dead reckoning position information, the dead reckoning position information being determined according to attitude change information of the object measured by an inertial measurement unit (IMU); determining a fusion positioning model matching the update information, the fusion positioning model being used for performing fusion positioning using the update information; determining error information of the update information, the error information indicating error conditions of the update information; and performing the fusion positioning on the GPS positioning information and the dead reckoning position information of the update information according to the fusion positioning model with the error information to obtain a current position of the object.

According to an embodiment, there is provided a positioning apparatus including at least one memory configured to store computer program code; at least one processor configured to access the at least one memory and operate as instructed by the computer program code. The computer program code includes: obtaining code configured to cause the at least one processor to obtain update information of an object, the update information including GPS positioning information and dead reckoning position information, the dead reckoning position information being determined according to attitude change information of the object measured by an inertial measurement unit (IMU); determining code configured to cause the at least one processor to: determine a fusion positioning model matching the update information, the fusion positioning model being used for performing fusion positioning using the update information, and determine error information according to the update information, the error information being used for indicating error conditions of the update information; and positioning code configured to cause the at least one processor to perform the fusion positioning on the GPS positioning information and the dead reckoning position information of the update information according to the fusion positioning model with the error information to obtain a current position of the object.

According to an embodiment, there is provided a non-transitory computer-readable storage medium storing computer program code to cause at least one processor to: obtain update information of an object, the update information including GPS positioning information and dead reckoning position information, the dead reckoning position information being determined according to attitude change information of the object measured by an inertial measurement unit (IMU); determine a fusion positioning model matching the update information, the fusion positioning model being used for performing fusion positioning using the update information; determine error information of the update information, the error information indicating error conditions of the update information; and perform the fusion positioning on the GPS positioning information and the dead reckoning position information of the update information according to the fusion positioning model with the error information to obtain a current position of the object.

In addition, the positioning method according to an embodiment may include determining a preferred fusion positioning model among the sample fusion positioning models based on a sample quantity corresponding to one of the sample fusion positioning models having the largest sample quantity value as the fusion positioning model corresponding to the preset quantity of sample update information; and determining, based on the preset quantity of the sample update information or the sample update information having the sample quantity which has the largest value, and classification results of the fusion positioning models, a correspondence between the update information and the classification results of the fusion positioning models.

BRIEF DESCRIPTION OF THE DRAWINGS

To describe the technical solutions of the embodiments of the disclosure more clearly, the following briefly describes the accompanying drawings for describing the embodiments. Apparently, the accompanying drawings in the following description show only some example embodiments of the disclosure, and a person of ordinary skill in the art may still derive other embodiments from the accompanying drawings without creative efforts.

DESCRIPTION

To make the objectives, technical solutions, and advantages of the disclosure clearer, the following further describes the embodiments of the disclosure in detail with reference to the accompanying drawings.

A positioning method provided in this disclosure may be applied to any related device (for example, an in-vehicle navigator) which can perform positioning according to inertial sensing parameters measured by an inertial measurement unit (IMU), to perform the positioning. The related device includes the inertial measurement unit and a GPS positioning apparatus, the inertial measurement unit being an apparatus for measuring a three-axis attitude angle (or angular rate) and acceleration of an object. For example, the related device is an in-vehicle navigator. After the inertial measurement unit measures attitude change information and the GPS positioning apparatus obtains GPS positioning information, the related device may combine the attitude change information and the GPS positioning information to perform a fusion positioning to obtain a final position. In another embodiment, the positioning method may be applied to another device that can perform a related operation. After obtaining attitude change information and GPS positioning information transmitted by a device such as an in-vehicle navigator, the device may perform a fusion positioning to obtain a final position. Then, the obtained final position is returned to the device such as the in-vehicle navigator, so that the device can apply the obtained final position. In the following embodiments, the description is made with reference to an example that the related device performs a fusion positioning to obtain a final position.

Figure 1:
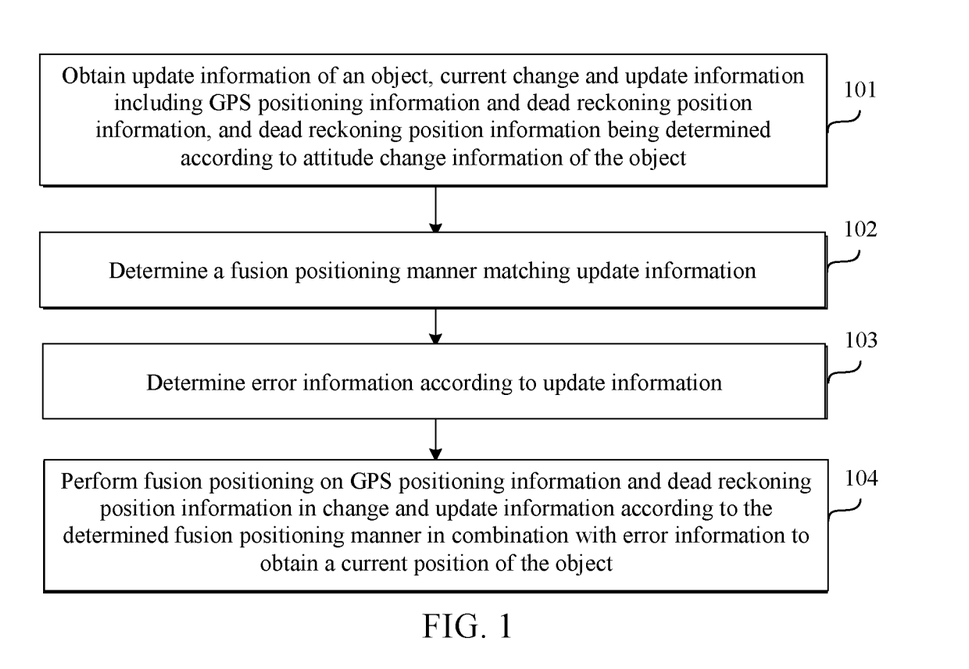
FIG. 1 is a flowchart of a positioning method according to an embodiment.

FIG. 1 is a flowchart of a positioning method according to an exemplary embodiment. The description is made with reference to an example that the method is applied to a terminal. As shown in FIG. 1, the method includes:

Step 101. Obtain current change and update information, the current change and update information including GPS positioning information and dead reckoning position information, the dead reckoning position information being determined according to attitude change information of a terminal.

Here, an in-vehicle navigation device is used as an example. After the in-vehicle navigation device is started, the change and update information may be obtained at a regular interval.

The foregoing GPS positioning information refers to GPS positioning information detected through a GPS positioning module at a current moment, for example, a GPS angle, a GPS position, and the like. The foregoing current attitude change information may be determined by using related parameters detected by an inertial measurement unit.

The inertial measurement unit is an apparatus for measuring a three-axis attitude angle (or angular rate) and an acceleration of an object. In an embodiment, the inertial measurement unit includes at least one of an accelerometer and a gyroscope. The accelerometer is an instrument used for measuring acceleration. The gyroscope, also referred to as an angular velocity sensor, is an instrument used for measuring rotational angular velocity of an object when deflecting or tilting, or used for sensing directions. In this case, the corresponding current attitude change information may include parameters such as measured acceleration and angular velocity.

As described above, in a case that the dead reckoning position information is determined according to the current attitude change information, the dead reckoning position information may be obtained by performing dead reckoning (DR) on the current attitude change information.

The manner of determining the dead reckoning position information includes at least one of the following manners:

(1) performing odometer error processing on odometer data recorded by an odometer, and performing dead reckoning according to the current attitude change information after performing a speed update based on the odometer data after the odometer error processing, to obtain the dead reckoning position information, the attitude change information including speed information;

(2) updating the attitude change information according to a rotation speed of a gyroscope and angular velocity increments successively acquired twice by the gyroscope, and performing dead reckoning according to the updated current attitude change information to obtain the dead reckoning position information;

(3) performing dead reckoning according to the current attitude change information after performing attitude alignment based on acceleration acquired by an accelerometer, to obtain the dead reckoning position information; and (4) performing dead reckoning according to the current attitude change information after performing attitude alignment based on GPS azimuth and acceleration acquired by an accelerometer, to obtain the dead reckoning position information.

Step 102. Determine a fusion positioning manner (or "fusion positioning model" used interchangeably herein) by matching the current change and update information (or simply "update information").

The fusion positioning manner (or fusion positioning model) may be determined according to at least two fusion positioning manners. The at least two fusion positioning manners include a Kalman filter-based fusion positioning manner (or Kalman filter-based fusion positioning algorithm) and a particle filter-based fusion positioning manner (or Kalman filter-based fusion positioning algorithm). The fusion positioning manners may alternatively include another type of fusion positioning manner, and include a plurality of fusion positioning manners.

In an embodiment, a previously matched fusion positioning manner may be used as the fusion positioning manner. Specifically, in a case that a current moment is in a preset time period after matching the fusion positioning manner, the matched fusion positioning manner may be determined as the fusion positioning manner. In this case, the previously matched fusion positioning manner may be directly used for fusion positioning, and there is no need to dynamically determine a suitable fusion positioning manner constantly, thereby reducing device performance overheads, improving processing efficiency, and improving smoothness.

In an embodiment, when the in-vehicle navigation device is started, historical change and update information obtained before the start may be used as sample change and update information, and a fusion positioning model may be trained by using the sample change and update information to obtain a trained fusion positioning model. Further, a fusion positioning manner may be obtained by inputting the current change and update information into the fusion positioning model.

In another embodiment, the training process for the fusion positioning model may also be performed after the in-vehicle navigation device is started. After a specific time period from the start, change and update information acquired in the time period may be used as sample change and update information. That is, in a time period of a specified time length after the in-vehicle navigation device is started, fusion positioning manners in an initial fusion positioning model are used for fusion positioning, so that the fusion positioning model obtained by training better fits a current actual application state of the in-vehicle navigation device, thereby improving positioning performance such as smoothness in an actual positioning process. In this embodiment, the current change and update information refers to change and update information obtained in a positioning process after obtaining the fusion positioning model by training.

In addition, the determining the matched fusion positioning manner may include the following steps 1021 and 1022.

Step 1021. Determine model input features based on the current change and update information.

In an embodiment, in a case that the model input features are determined, information processing may be performed based on the current change and update information to obtain the model input features corresponding to input parameters of the fusion positioning model.

For example, when a Kalman filter-based fusion positioning manner is used, the model input features determined based on the current change and update information may include parameters such as a dead reckoning angle, a dead reckoning position error, a gyroscope drift, a mileage error coefficient, a GPS angle error, and a GPS position error. It may be understood that the fusion positioning model may be different depending on whether Kalman filter-based fusion positioning manner or a particle filter-based fusion positioning manner is used, and corresponding model input features (for example, a quantity and a type) may be different. However, a manner of obtaining the model input features is not specifically limited to this embodiment.

The determined model input features may be combined into eigenvectors or be combined into a feature matrix, and inputted into the fusion positioning model.

Step 1022. Input the model input features into a fusion positioning model obtained by training, to determine the fusion positioning manner matching the current change and update information.

The fusion positioning model is obtained based on the foregoing training, and weights corresponding to input parameter features of the fusion positioning model are determined. The model input features are inputted into the fusion positioning model obtained by training, so that based on values corresponding to the input parameter features corresponding to the change and update information, and the weights corresponding to the input parameter features, probabilities that the change and update information belongs to classes of fusion positioning manners may be determined. For example, the fusion positioning model includes a Kalman filter-based fusion positioning manner and a particle filter-based fusion positioning manner. By inputting the model input features into the fusion positioning model obtained by training, a first probability that the change and update information is classified as the Kalman filter-based fusion positioning manner and a second probability that the change and update information is classified as the particle filter-based fusion positioning manner may be obtained.

In an embodiment, a fusion positioning manner corresponding to the greatest probability may be determined as a classification result of the matched fusion positioning manner. For example, in a case that the first probability is greater than the second probability, the Kalman filter-based fusion positioning manner is used as the matched fusion positioning manner.

In an embodiment, a fusion positioning manner may be determined based on a probability value that is greater than or equal to a predetermined probability threshold. For example, in a case that a value of the first probability is greater than a value of the second probability, and the value of the first probability is greater than or equal to the predetermined probability threshold, the Kalman filter-based fusion positioning manner is used as the matched fusion positioning manner. The predetermined probability threshold may be set by a user according to actual technical requirements.

Furthermore, in a case that the greatest probability is less than a predetermined probability threshold, a fusion positioning manner used at a previous moment (which may be a fusion positioning manner automatically matched at the previous moment, or may be a fusion positioning manner matched before the previous moment) may be determined as the matched fusion positioning manner. For example, in a case that a value of the first probability is greater than a value of the second probability, however, the value of the first probability is less than the predetermined probability threshold, it indicates that a difference between advantages of using the Kalman filter-based fusion positioning manner and the particle filter-based fusion positioning manner for the fusion positioning is not obvious, so the fusion positioning manner used previously may be used, which can provide the positioning process with relatively better smoothness over switching to another fusion positioning manner.

Step 103. Determine error information according to the current change and update information.

For different fusion positioning manners, information that needs to be used may be different. For example, the particle filter-based fusion positioning manner estimates a fusion position based on probability distribution of particles, which may be unnecessary to calculate the error information. The Kalman filter-based fusion positioning manner performs the fusion positioning according to the dead reckoning position information. The process needs to be performed in combination with the error information. In this embodiment, the description is made with reference to an example of a fusion positioning manner including parameters of the error information.

In an embodiment, the error information may be determined based on GPS positioning information and dead reckoning position information. The error information may include at least one of a GPS positioning error, a dead reckoning error, an inter-positioning information error between the GPS positioning information and the dead reckoning position information.

The GPS positioning error includes at least one of a GPS angle error and a GPS position error. The dead reckoning error may be determined based on GPS position increments of the GPS positioning information for a preset quantity of successive times, and may specifically include at least one of a DR position error, a gyroscope drift and a DR mileage error coefficient. The inter-positioning information error includes at least one of an angle error between the GPS positioning information and the dead reckoning position information, and a position error between the GPS positioning information and the dead reckoning position information.

Step 104. Perform the fusion positioning on the GPS positioning information and the dead reckoning position information in the current change and update information according to the fusion positioning manner in combination with the error information, to obtain a current position.

The fusion positioning based on the matched fusion positioning manner may be performed based on an existing fusion positioning process of the matched fusion positioning manner, or based on an improved process of the fusion positioning manner, which is not limited to this embodiment.

In addition, in a fusion positioning process, according to the GPS positioning information and the dead reckoning position information in combination with the foregoing determined error information, the fusion positioning is performed on corresponding information in the current change and update information, to determine the current position. In an embodiment, an initial position obtained by the fusion positioning is updated according to the foregoing determined error information to obtain a final current position.

In an embodiment, for example, the matched fusion positioning manner is the Kalman filter-based fusion positioning manner. The manner in which the Kalman filter-based fusion positioning manner may be used for the fusion positioning, to obtain the final position may be any Kalman filter-based fusion positioning manner which exists currently or may appear in the future. As described above, when the fusion positioning is performed, a weighted parameter Q of a predicted value may be used as a fixed value, a weighted parameter R of a measured value may be used as an adjusted value, and the weighted parameter R of the measured value may be adjusted based on a relative error of the GPS positioning information.

It is to be understood that, although some of the fusion positioning algorithms are provided in the foregoing embodiments, in an actual technical implementation process, other fusion positioning manners may be provided and used as a fusion positioning model.

Figure 2:
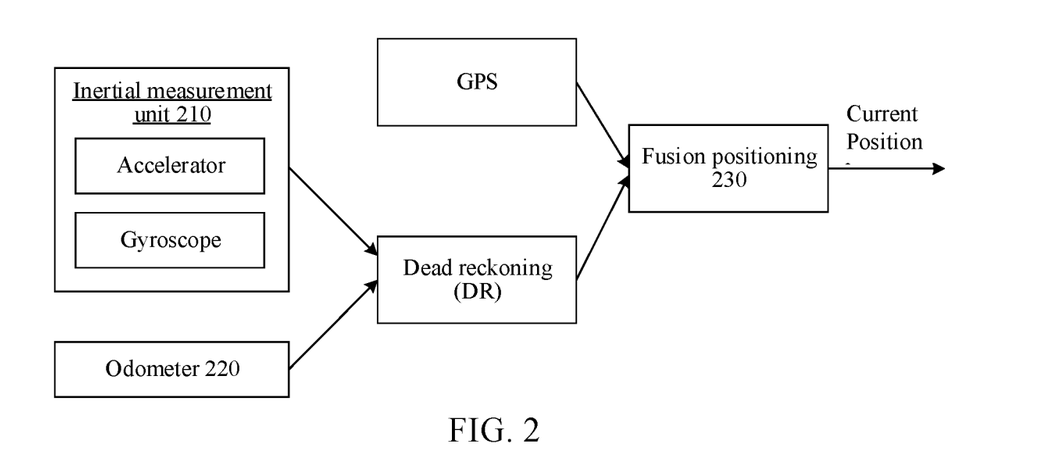
FIG. 2 is a schematic diagram of a positioning method according to an embodiment.

FIG. 2 is a schematic diagram of a positioning method according to an embodiment. Dead reckoning (DR) is determined by using an inertial measurement unit 210 and an odometer 220, fusion positioning 230 is obtained according to the GPS and the DR, and a positioned position or a current position of an object is outputted.

According to a positioning method provided in an embodiment, GPS positioning information and dead reckoning position information are obtained, and a matched fusion positioning manner and error information are determined based on each information. The fusion positioning is performed according to the matched fusion positioning manner and the error information, to obtain a current position of an object. The matched fusion positioning manner can be classified dynamically to perform the fusion positioning, which can effectively improve precision of the fusion positioning, and provide relatively robust performance in different scenarios.

In an embodiment, a fusion positioning model is first obtained by means of training or learning, and then the fusion positioning model is applied to an actual positioning process to implement real-time fusion positioning. The fusion positioning model may be obtained by training of a device (for example, an in-vehicle navigation device) which actually performs positioning. Alternatively, after the fusion positioning model is obtained by training of a third-party device (for example, a server), the trained fusion positioning model may be transmitted from the server to a device (for example, an in-vehicle navigation device) which actually performs positioning, and the device completes the actual positioning process based on the trained fusion positioning model received.

Figure 3:
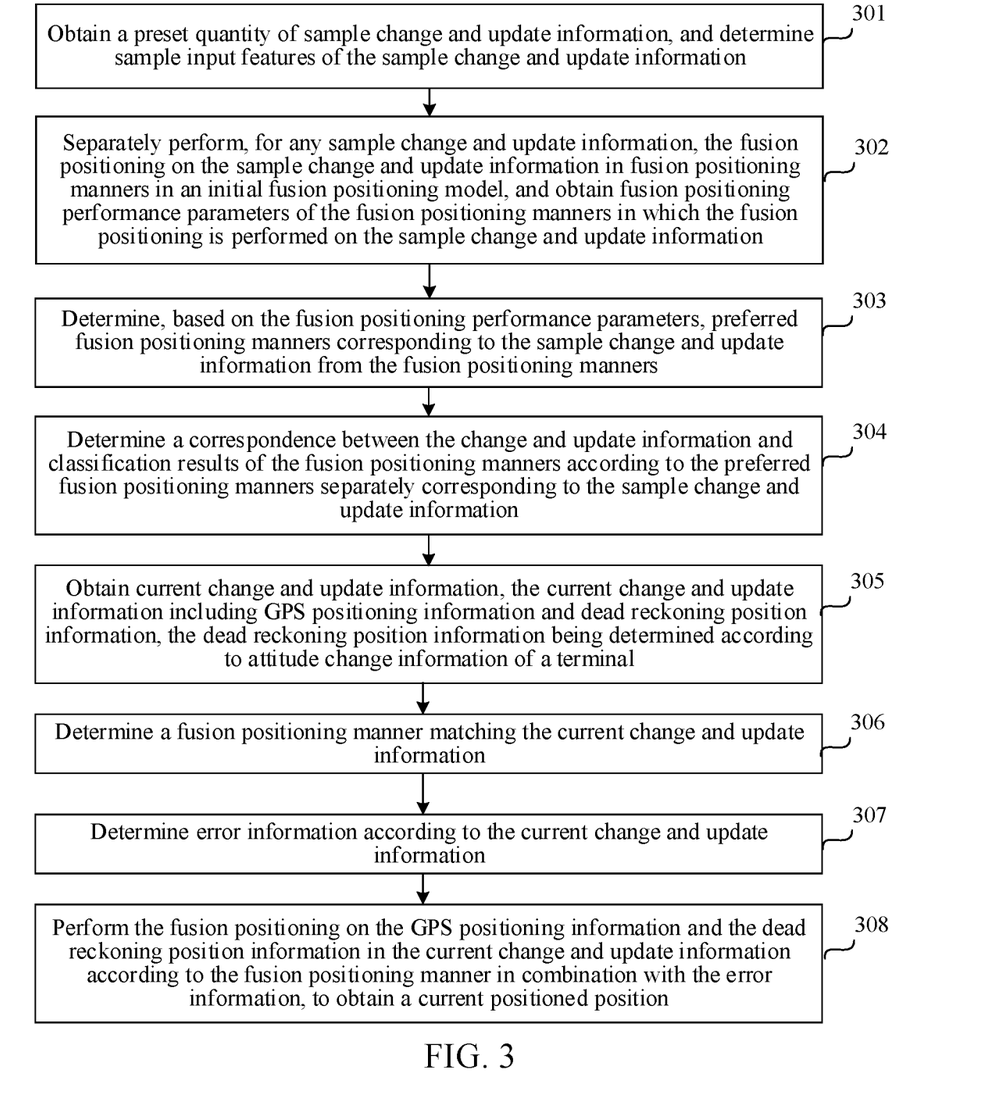
FIG. 3 is a flowchart of a positioning method according to an embodiment.

The fusion positioning model obtained by the training or learning is used as an example. FIG. 3 is a flowchart illustrating a method of training a positioning method according to an embodiment. As shown in FIG. 3, a positioning method according to an embodiment includes the following steps 301 to 308.

Step 301: Obtain a preset quantity of sample change and update information, and determine sample input features of the sample change and update information.

In a model training process, after the sample change and update information is obtained, all of the sample change and update information may be used as a set, or all of the sample change and update information may be divided into a plurality of sets. Each set includes a specified quantity of sample change and update information, and the quantity of sample change and update information included in the each set may be set according to a predetermined quantity value based on actual technical requirements. In this embodiment, the quantity of sample change and update information included in a set is recorded as the preset quantity.

In an embodiment, any sample change and update information may include: sample GPS positioning information and sample dead reckoning position information associated with each other. In another embodiment, any sample change and update information may include sample GPS positioning information and sample attitude change information associated with each other. In a case that it is necessary to perform the training or in an initial stage of the training, dead reckoning is performed based on the sample attitude change information to obtain corresponding sample dead reckoning position information. The sample GPS positioning information may be GPS information obtained by using a GPS positioning module or GPS positioning information obtained in other manners.

The dead reckoning refers to reckoning a position at a next moment by measuring a distance and orientation of movement under a condition that a position at a current moment is given. In a case that the dead reckoning is performed based on the attitude change information to obtain the corresponding dead reckoning position information, a process of the dead reckoning may include two parts, namely, a vehicle attitude update and a position update provided by a gyroscope. In an embodiment, the dead reckoning may be performed after a speed update. The speed update may be determined based on odometer data provided by an odometer. During the speed update, odometer error processing is performed on the odometer data recorded by the odometer, and the speed update is performed based on odometer data after the odometer error processing.

The vehicle attitude update may be performed by using the following update equation (1):

$$q_{bk}^{n} = q_{bk-1}^{n} q_{bk}^{bk-1} \quad (1)$$

where $q_{bk}^{n}$ is an attitude quaternion of a system N (navigation coordinate system) at a moment k, $q_{bk-1}^{n}$ is an attitude quaternion of the system N at a moment k−1, and $q_{bk}^{bk-1}$ is an attitude transformation quaternion of a system B (body coordinate system) from the moment k−1 to the moment k.

$q_{bk}^{bk-1}$ may be determined based on a rotation angular velocity $w_{nb}^{b}$ of the system B relative to the system N. A corresponding equivalent rotation vector from a moment tk−1 to a moment tk is:

$$A_k = \int_{tk-1}^{tk} w_{nb}^{b} dt = \int_{tk-1}^{tk} \{w_{ib}^{b} - [C_{b}^{n}]^{T} w_{in}^{n}\} dt \quad (2)$$

where $w_{ib}^{b}$ indicates an angular velocity of the system B relative to a system I (geocentric inertial coordinate system), $w_{nb}^{b}$ indicates the rotation angular velocity of the system B relative to the system N, and $C_{b}^{n}$ indicates a coordinate matrix from the system B to the system N; $w_{in}^{n} = w_{ie}^{n} + w_{en}^{n}$, where $w_{ie}^{n}$ is an angular velocity of earth rotation, which is a constant value, and $w_{en}^{n}$ indicates a northward component of an angular velocity of the system N relative to a system E (earth coordinate system); and $$w_{en}^{n} = \left[ \frac{v_n^n}{r_m + h_{k-1}}, \frac{v_e^n}{r_m + h_{k-1}}, \frac{v_e^n \tan Lon_{k-1}}{r_n + h_{k-1}} \right]^T \quad (3)$$

where $v_n^n$ indicates an inertial navigation northward speed, $r_m$ indicates a semi-major axis radius of the earth, $h_{k-1}$ indicates an altitude at the moment k−1, $v_e^n$ indicates an inertial navigation eastward speed, tan indicates a trigonometric function of tangent, $Lon_{k-1}$ indicates longitude at the moment k−1, and $r_n$ indicates a semi-minor axis radius of the earth.

$$\int_{tk-1}^{tk} w_{ib}^{b} dt$$

may be calculated by using a two-sample algorithm of the equivalent rotation vector:

$$A_{ib} = \int_{tk-1}^{tk} w_{ib}^{b} dt = \text{delta}(A_1) + \text{delta}(A_2) + \frac{2}{3}\text{delta}(A_1)\text{delta}(A_2) \quad (4)$$

where $A_{ib}$ indicates a rotation angle of a gyroscope from the moment k−1 to the moment k, delta($A_1$) and delta($A_2$) are angular velocity increments successively acquired twice by the gyroscope.

The position update may be performed by using the following formulas:

$$Lon_k = Lon_{k-1} + \frac{tv_e^n \sec Lat_k}{r_n + h_{k-1}} \quad (5)$$

$$Lat_k = Lat_{k-1} + \frac{tv_n^n}{r_m + h_{k-1}} \quad (6)$$

$$h_k = h_{k-1} + tv_u^n \quad (7)$$

where $Lon_k$ indicates longitude at the moment k, t indicates time, $v_e^n$ indicates the inertial navigation eastward speed, sec is a trigonometric function of secant, $r_n$ indicates the semi-minor axis radius of the earth, Lat refers to latitude, $Lat_k$ indicates latitude at the moment k, $r_m$ indicates the semi-major axis radius of the earth, and $v_u^n$ indicates an inertial navigation antenna speed. Based on this, DR error equations may be obtained:

$$\text{delta}(P) = p_1 A + p_2 \text{delta}(P) + p_3 \quad (8)$$

$$\text{delta}(A) = a_1 A + a_2 \text{delta}(P) + a_3 \quad (9)$$

Values of parameters (including $p_1$, $p_2$, $p_3$, $a_1$, $a_2$, and $a_3$) in the error equations may be determined by substituting the foregoing DR error equations (8) and (9) into the foregoing equations (1) to (7), and the values may be applied to a model training and actual positioning process. It may be seen based on the foregoing DR error equations that, a position error delta(P) at a current moment and an inertial navigation angle error delta(A) may be determined according to an inertial navigation angle A at the current moment and an inertial navigation angle error delta(P) at a previous moment.

As described above, during the dead reckoning, it is unnecessary to use information about an accelerometer. In an embodiment, the foregoing dead reckoning process may alternatively be performed after attitude alignment is performed by using acceleration measured by an accelerometer. The attitude alignment mainly refers to pitch and roll alignment, however, the embodiment is not specifically limited thereto. In an embodiment, an in-vehicle navigation system is used as an example. In a case that the in-vehicle navigation system uses an MEMS gyroscope, a GPS azimuth may be used for assisting in the alignment. For example, the dead reckoning may be performed after attitude alignment is performed according to acceleration measured by an accelerometer and the GPS azimuth.

Step 302. Separately perform, for any sample change and update information, the fusion positioning on the sample change and update information in fusion positioning manners in an initial fusion positioning model, and obtain fusion positioning performance parameters of the fusion positioning manners in which the fusion positioning is performed on the sample change and update information.

The fusion positioning performance parameters may include any parameter that can be used for evaluating performance of the fusion positioning. For example, the fusion positioning performance parameters may include, but are not limited to parameters such as time consumption of the fusion positioning, resource occupation of the fusion positioning and positioning precision.

Input of the initial fusion positioning model may include GPS positioning information and current attitude change information, or may include GPS positioning information and dead reckoning position information obtained by performing dead reckoning based on the current attitude change information. The initial fusion positioning model may include more than two fusion positioning manners. In an embodiment, a particle filter-based fusion positioning manner and a Kalman filter-based fusion positioning manner may be included. In other embodiments, the initial fusion positioning model may alternatively include other fusion positioning manners or include more fusion positioning manners such as a fusion positioning manner of Bayesian estimation and a fusion positioning manner of fuzzy logic. In the following examples, the description is made with reference to an example in which the particle filter-based fusion positioning manner and the Kalman filter-based fusion positioning manner are simultaneously included.

For example, the initial fusion positioning model may simultaneously include the particle filter-based fusion positioning manner and the Kalman filter-based fusion positioning manner. In one aspect, the fusion positioning is performed on the sample change and update information in the particle filter-based fusion positioning manner to obtain a sample fusion position determined by performing the fusion positioning on the sample change and update information based on the particle filter-based fusion positioning manner, and the fusion positioning performance parameters. A specific process of the fusion positioning may be performed based on any existing or future possible manner of a particle filter fusion algorithm. In another aspect, the fusion positioning is performed on the sample change and update information in the Kalman filter-based fusion positioning manner to obtain a sample fusion position determined by performing the fusion positioning on the sample change and update information based on the Kalman filter-based fusion positioning manner, and the fusion positioning performance parameters.

In a Kalman filter algorithm, the following five basic equations are included, where an equation (10) and an equation (11) relate to time update, and an equation (12), an equation (13), and an equation (14) relate to state update.

$$X_{(k|k-1)} = F X_{(k-1|k-1)} + B U_{(k)} \quad (10)$$

$$P_{(k|k-1)} = F P_{(k-1|k-1)} F^T + Q \quad (11)$$

$$X_{(k|k)} = X_{(k|k-1)} + Kg_{(k)}(Z_{(k)} - H X_{(k|k-1)}) \quad (12)$$

$$Kg_{(k)} = P_{(k|k-1)} H^T (H P_{(k|k-1)} H^T + R)^{-1} \quad (13)$$

$$P_{(k|k)} = (I - Kg_{(k)} H) P_{(k-1|k-1)} \quad (14)$$

As described in the foregoing equations (10) to (14), in the Kalman filter algorithm, there are two parameters Q and R. The parameter Q represents statistical characteristics of a Kalman filter algorithm model, reflects weighting of a predicted value of the model, and is referred to as a weighted parameter Q of the predicted value. The parameter R represents noise measurement characteristics in a measurement process, reflects weighting of a measured value, and is referred to as a weighted parameter R of the measured value. A larger weighted parameter Q of the predicted value indicates that the measured value is more reliable. A larger weighted parameter R of the measured value indicates that the predicted value of the model is more reliable.

I in the equation (14) is a matrix. For example, a single-model single measurement, I=1.

In this embodiment, the foregoing two equations (10) and (11) are used as prediction equations, and the foregoing equations (12), (13), and (14) are used as update equations. State modeling is performed according to the Kalman filter algorithm, and the model after the modeling may include related parameters used for Kalman filter-based positioning, for example, dead reckoning position information, a dead reckoning error, and the like. In an embodiment, a model after the modeling may include the following related contents.

$$X = [A_{dr}, \text{delta}(P_{dr}), E, \text{delta}(K), \text{delta}(A_g), \text{delta}(P_g)]^T \quad (15)$$

$$F = \begin{bmatrix} F1_{3\times3}, F2_{3\times3}, 0_{3\times3}, 0_{3\times3}, -C^n_{b3\times3}, F3_{3\times3}, \\ F4_{3\times3}, F5_{3\times3}, 0_{3\times3}, 0_{3\times3}, 0_{3\times3}, F6_{3\times3}, 1_{3\times3}, \\ 0_{3\times6}, 1_{3\times3}, 0_{3\times9}, \\ 0_{3\times9}, 1_{3\times3}, 0_{3\times6}, \\ 0_{3\times12}, 1_{3\times3}, 0_{3\times3}, \\ 0_{3\times15}, 1_{3\times3} \end{bmatrix} \quad (16)$$

$$\begin{aligned} Z_p &= P_g - P_{dr} \\ &= (P + \text{delta}(P_g)) - (P + \text{delta}(P_{dr})) \\ &= \text{delta}(P_g) - \text{delta}(P_{dr}) \end{aligned} \quad (17)$$

$$Z_a = \text{delta}(A_{dr}) - \text{delta}(P_{dr}) \quad (18)$$

$$Z = [Z_p \ Z_a]^T \quad (19)$$

$$H = \begin{bmatrix} -I_{3\times3}, 0_{3\times3}, I_{3\times3}, 0_{3\times3}, 0_{3\times3}, 0_{3\times3}, \\ 0_{3\times3}, -I_{3\times3}, 0_{3\times3}, I_{3\times3}, 0_{3\times3}, 0_{3\times3} \end{bmatrix} \quad (20)$$

It may be determined based on the equation (15) that, Kalman filter-based fusion positioning may be performed based on a dead reckoning angle, a dead reckoning position error, a gyroscope drift, a mileage error coefficient, a GPS angle error and a GPS position error. Here, $A_{dr}$ indicates the DR angle, $\text{delta}(P_{dr})$ indicates the DR position error, E indicates the gyroscope drift, $\text{delta}(K)$ indicates the DR mileage error coefficient, $\text{delta}(A_g)$ indicates the GPS angle error, and $\text{delta}(P_g)$ indicates the GPS position error. $F1_{3\times3}$ indicates a matrix F1 with 3 rows and 3 columns, $F2_{3\times3}$ indicates a matrix F2 with 3 rows and 3 columns, and so on for $F3_{3\times3}$, $F4_{3\times3}$, $F5_{3\times3}$ and $F6_{3\times3}$. $0_{3\times3}$ indicates a null matrix with 3 rows and 3 columns, the null matrix meaning that all elements in the matrix are 0. $C_{b\ 3\times3}{}^n$ indicates a transformation matrix with 3 rows by 3 columns from a coordinate system B to a coordinate system N. $1_{3\times3}$ indicates a unit matrix with 3 rows by 3 columns, the unit matrix meaning that all diagonal elements in the matrix are 1 and all other elements are 0. $0_{3\times6}$ indicates a null matrix with 3 rows by 6 columns, $0_{3\times9}$ indicates a null matrix with 3 rows by 9 columns, $0_{3\times12}$ indicates a null matrix with 3 rows by 12 columns, and $0_{3\times15}$ indicates a null matrix with 3 rows by 15 columns. P indicates current position information, and the current position information in an embodiment includes longitude, latitude, and altitude. $Z_p$ indicates a position error between GPS positioning information and DR positioning information, and $Z_a$ indicates an angle error between the GPS positioning information and the DR positioning information.

Accordingly, in a case that the initial fusion positioning model includes the Kalman filter-based fusion positioning manner, the performing the fusion positioning on the sample change and update information in the Kalman filter-based fusion positioning manner may include the following steps A1 to A3.

Step A1: Determine, based on sample dead reckoning position information, a corresponding sample dead reckoning error according to the error equations (8) and (9) provided above.

Step A2: Perform the fusion positioning based on sample GPS positioning information and the sample dead reckoning position information in the Kalman filter-based fusion positioning manner in the initial fusion positioning model, to obtain an initial fusion position, initial fusion positioning performance parameters, and a corrected value of the sample dead reckoning error corresponding to the Kalman filter-based fusion positioning manner.

In an embodiment, in a process of performing the fusion positioning on the sample change and update information in the Kalman filter-based fusion positioning manner, a weighted parameter Q of a predicted value may be used as a fixed value, and a weighted parameter R of a measured value may be used as an adjusted value for adjustment. For example, the weighted parameter R of the measured value may be adjusted based on dilution of precision (DOP) of the GPS positioning information, so that in a place where a GPS signal is weak, a fusion result may be inclined towards using the DR information.

Step A3: Correct the initial fusion position based on the corrected value of the sample dead reckoning error to obtain a corresponding fusion positioned position and corresponding fusion positioning performance parameters.

Step 303. Determine, based on the fusion positioning performance parameters, fusion positioning manners corresponding to the sample change and update information from the fusion positioning manners.

In a case that the fusion positioning manners are determined based on the fusion positioning performance parameters, any possible manner may be used on a basis that information contents specifically included in the fusion positioning performance parameters are different.

For example, the fusion positioning performance parameters include only resource occupation of the fusion positioning. Then, a fusion positioning manner corresponding to the smallest resource occupation may be used as a preferred fusion positioning manner corresponding to the sample change and update information. For example, the fusion positioning performance parameters include more than two parameters. Then, the two parameters may be comprehensively considered (for example, after weighting), from which a fusion positioning manner corresponding to a weighted optimal value (for example, a maximum value, a minimum value, or the like) is selected, and used as the preferred fusion positioning manner corresponding to the sample change and update information. In other embodiments, the preferred fusion positioning manner corresponding to the sample change and update information may alternatively be determined in other manners.

Step 304. Determine a correspondence between the change and update information and classification results of the fusion positioning manners according to the preferred fusion positioning manners separately corresponding to the sample change and update information.

Figure 4:
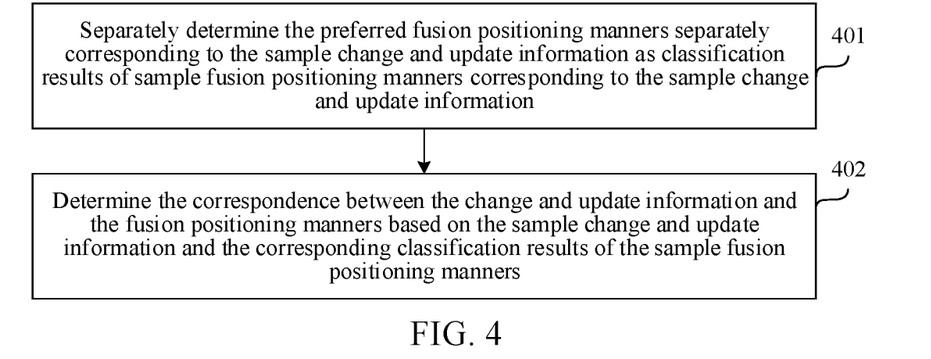
FIG. 4 is a flowchart of a positioning method according to an embodiment.

In an embodiment, the correspondence between the change and update information and the classification results of the fusion positioning manners may be determined according to all of the sample change and update information. As shown in FIG. 4, the following steps 401 and 402 are specifically included.

Step 401. Separately determine the preferred fusion positioning manners corresponding to the sample change and update information as classification results of sample fusion positioning manners corresponding to the sample change and update information.

That is, based on the classification results, for any sample change and update information, a corresponding preferred fusion positioning manner is.

Step 402. Determine the correspondence between the change and update information and the fusion positioning manners based on the sample change and update information and the corresponding classification results of the sample fusion positioning manners.

However, the embodiment is not limited thereto, and other manners may be used for determining the correspondence, such as curve fitting.

Figure 5:
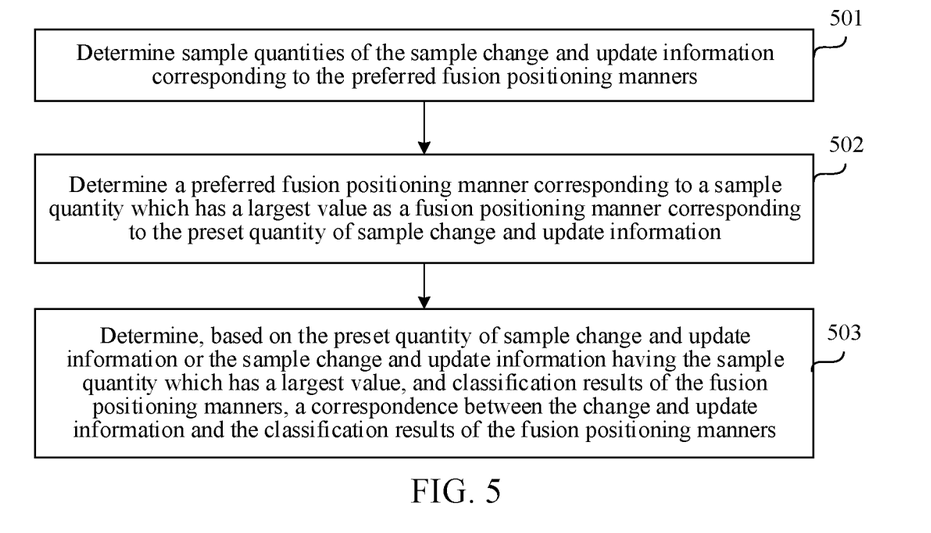
FIG. 5 is a flowchart of a positioning method according to an embodiment.

In another embodiment, the correspondence between the change and update information and the classification results of the fusion positioning manners may be determined for most of the sample change and update information. In other words, one or more of the sample change and update information may correspond to the same preferred fusion positioning manner, which may account for most of the preset quantity of sample change and update information. FIG. 5 is a flowchart further describing the determining the correspondence between the change and update information and the fusion positioning manners.

Step 501. Determine sample quantities of the sample change and update information corresponding to the respective fusion positioning manners.

It is assumed that the preset quantity is N, and the initial positioning model includes two fusion positioning manners: the Kalman filter-based fusion positioning manner and the particle filter-based fusion positioning manner. In N pieces of sample change and update information, if fusion positioning manners corresponding to K1 pieces of sample change and update information among the N pieces of sample change and update information are the Kalman filter-based fusion positioning manner, a sample quantity of the sample change and update information corresponding to the Kalman filter-based fusion positioning manner is K1; and if fusion positioning manners corresponding to K2 pieces of sample change and update information among the N pieces of sample change and update information are the particle filter-based fusion positioning manner, a sample quantity of the sample change and update information corresponding to the particle filter-based fusion positioning manner is K2.

Step 502. Determine a preferred fusion positioning manner corresponding to a sample quantity which has the largest value as a fusion positioning manner corresponding to the preset quantity of sample change and update information.

As described above, in a case that K1 is greater than K2, the Kalman filter-based fusion positioning manner is determined as a classification result of the sample fusion positioning manner corresponding to the N pieces of sample change and update information.

In an embodiment, when a fusion positioning manner corresponding to a sample quantity has the largest value and has a proportion larger than a preset proportion, the fusion positioning manner may be determined as the classification result of the fusion positioning manner corresponding to a preset quantity of sample change and update information. As described above, in a case that K1 is greater than K2, and K1/N is greater than or equal to a preset proportion, the Kalman filter-based fusion positioning manner is determined as a classification result of the sample fusion positioning manner corresponding to the N pieces of sample change and update information. By setting the preset proportion, it may be quickly determined how much of change and update information is assigned to a fusion positioning manner, thereby improving the performance of fusion positioning.

Step 503. Determine, based on the preset quantity of sample change and update information or the sample change and update information having the sample quantity which has the largest value, and classification results of the fusion positioning manners, a correspondence between the change and update information and the classification results of the fusion positioning manners.

In addition, any possible manner may be used for determining the correspondence, for example, curve fitting, which is not specifically limited to this embodiment.

After the foregoing training, a fusion positioning model may be determined based on the determined correspondence between the change and update information and the classification results of the fusion positioning manners in a case that a training ending condition is satisfied. Otherwise, an initial fusion positioning model continues to be updated. For example, weights corresponding to input parameter features in the initial fusion positioning model are updated, and a next round of a training process is performed. The training ending condition may be set according to actual requirements. For example, based on sample GPS positioning information, sample fusion positioned positions corresponding to the fusion positioning manners, and fusion positioning performance parameters, it may be determined whether there is a convergence in the values, for example, weight values. Based on satisfying a certain threshold in the convergence, the training ending condition may be satisfied. However, the training ending condition is not specifically limited thereto.

The fusion positioning model obtained based on the foregoing training process determines the weights corresponding to the input parameter features of the fusion positioning model. That is, the weights corresponding to the input parameter features may be different. Therefore, in a case that positioning is performed based on the fusion positioning model, based on values corresponding to the input parameter features corresponding to the change and update information, and the weights corresponding to the input parameter features, probabilities that the change and update information belongs to classes of the fusion positioning manners may be determined, so that a matched fusion positioning manner may be obtained to perform actual fusion positioning.

The fusion positioning model obtained through the foregoing training may be applied to an actual process of the fusion positioning. In a case that the training process is performed by a third party device (for example, a server), the fusion positioning model may be transmitted to positioning terminals (for example, an in-vehicle navigator, a mobile terminal, and the like). The positioning terminals finish the process of the fusion positioning by using the fusion positioning model. The fusion positioning model may alternatively be stored in the third party device. In the positioning process, when the third party device finishes the process of the fusion positioning based on GPS positioning information and attitude change information (or inertial positioning information determined based on the attitude change information) received from the terminal, it may return the obtained final position to the terminal for use. In a case that the training process is performed by the positioning terminal (for example, an in-vehicle navigation device), the positioning terminal may directly store the fusion positioning model and apply the fusion positioning model to a subsequent positioning process.

Hereafter, the description refers back to FIG. 3.

Step 305. Obtain current change and update information, the current change and update information including GPS positioning information and dead reckoning position information, the dead reckoning position information being determined according to attitude change information of a terminal.

The GPS positioning information refers to GPS positioning information detected through a GPS positioning module at a current moment, for example, a GPS angle and a GPS position. The current attitude change information may be determined by using parameters detected by an inertial measurement unit.

The inertial measurement unit is an apparatus for measuring a three-axis attitude angle (or angular rate) and acceleration of an object. In an embodiment, the inertial measurement unit may include an accelerometer and a gyroscope. The accelerometer is an instrument used for measuring acceleration. The gyroscope, also referred to as an angular velocity sensor, is an instrument used for measuring rotational angular velocity of an object when deflecting or tilting, or used for sensing directions. In this case, the corresponding current attitude change information may include parameters such as measured acceleration and angular velocity.

Step 306. Determine a fusion positioning manner matching the current change and update information.

Here, by inputting the current change and update information into the fusion positioning model, the fusion positioning manner corresponding to the current change and update information may be outputted.

Step 307. Determine error information according to the current change and update information.

The error information is determined based on GPS positioning information and dead reckoning position information. The error information may include at least one of a GPS positioning error, a dead reckoning error, or an inter-positioning information error between the GPS positioning information and the dead reckoning position information.

Step 308. Perform the fusion positioning on the GPS positioning information and the dead reckoning position information in the current change and update information according to the fusion positioning manner in combination with the error information to obtain a current position.

The fusion positioning based on the matched fusion positioning manner may be performed based on an existing fusion positioning process of the matched fusion positioning manner, or based on an improved process of the fusion positioning manner. However, the embodiment is not limited thereto. In a case that the matched fusion positioning manner is a first fusion positioning manner (for example, a Kalman filter-based fusion positioning manner), the fusion positioning is performed on corresponding information in the current change and update information in combination with the determined error information to determine the current position. For example, in an embodiment, an initial positioned position obtained by the fusion positioning is updated according to the foregoing determined error information to obtain a final current positioned position.

In an embodiment, for example, the matched fusion positioning manner is the Kalman filter-based fusion positioning manner. The manner in which the Kalman filter-based fusion positioning manner may be used for the fusion positioning to obtain the final position may be any Kalman filter-based fusion positioning manner which exists currently or may appear in the future, and details are not described herein again. As described above, when the fusion positioning is performed, a weighted parameter Q of a predicted value may be used as a fixed value, a weighted parameter R of a measured value may be used as an adjusted value, and the weighted parameter R of the measured value may be adjusted based on a relative error of the GPS positioning information.

It is to be understood that, although some example fusion positioning algorithms are described in the foregoing embodiments, in an actual technical implementation process, other fusion positioning manners may be further included or added to a fusion positioning model.

In addition, after performing the fusion positioning according to the matched fusion positioning manner, in order to determine the current position, the method may further include the following steps of performing the fusion positioning in the first fusion positioning manner at each of positioning moments within a preset time period from a current moment to determine positions corresponding to the positioning moments. Therefore, after the matched fusion positioning manner is obtained, the matched fusion positioning manner may be used for fusion positioning at positioning moments in a subsequent preset time period, and there is no need to dynamically match a fusion positioning manner continuously, thereby improving processing efficiency smoothness.

For example, after the matched fusion positioning manner (which may be limited to a fusion positioning manner matched based on the fusion positioning model in an embodiment) is obtained at the current moment, the fusion positioning may be performed in the fusion positioning manner at each of the positioning moments in the preset time period since the current moment. After the preset time period, the fusion positioning manner is matched again based on the fusion positioning model, to verify whether the matched fusion positioning manner still has relatively good fusion positioning performance. In a case that all fusion positioning manners matched for a specified quantity of successive times N1 or in a successive specified time period T1 are inconsistent, the fusion positioning manner may be matched again based on the fusion positioning model for a specified quantity of successive times N2 or in a successive specified time period T2, until all fusion positioning manners matched for a specified quantity of successive times N3 or in a successive specified time period T3 remain consistent. Values of N1, N2, and N3 may be the same or different, and values of T1, T2, and T3 may be the same or different.

In an embodiment, in a case that all of the fusion positioning manners matched for the specified quantity of successive times N1 or in the successive specified time period T1 are inconsistent, the training process may be performed again, so that a new fusion positioning model is trained for application. In another embodiment, after the matched fusion positioning manner (which may be limited to a fusion positioning manner matched based on the fusion positioning model in an embodiment) is obtained at the current moment, the training process may be directly performed again after the preset time period since the current moment, so that a new fusion positioning model is trained for application.

Based on the above, according to the positioning method provided in the embodiments of the disclosure, GPS positioning information and dead reckoning position information are obtained, and a matched fusion positioning manner and error information are determined. Then, fusion positioning is performed according to the matched fusion positioning manner and the error information, to obtain a current position, so that the matched fusion positioning manner can be classified dynamically to perform the fusion positioning, which can effectively improve precision of the fusion positioning, and can provide relatively robust performance in different scenarios.

According to an embodiment, a positioning apparatus is provided. The apparatus can be applied to any device which can obtain GPS information and inertial sensing parameters measured by an inertial measurement unit, and can perform the fusion positioning, for example, an in-vehicle navigation device.

Figure 6:
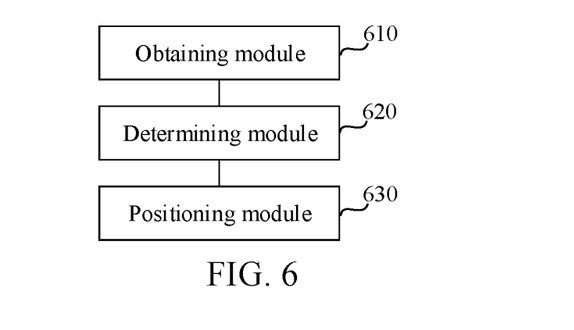
FIG. 6 is a schematic structural diagram of a positioning apparatus according to an embodiment.

FIG. 6 is a structural diagram of a positioning apparatus according to an embodiment. As shown in FIG. 6, the positioning apparatus includes an obtaining module 610, a determining module 620, and a positioning module 630. The obtaining module 610 is configured to obtain current change and update information (or simply "update information"), the current change and update information including GPS positioning information and dead reckoning position information, the dead reckoning position information being determined according to attitude change information of a terminal; the determining module 620 is configured to determine a fusion positioning manner (or algorithm and model) matching the current change and update information, the fusion positioning manner being used for performing fusion positioning by using information in the current change and update information, and determine error information according to the current change and update information, the error information being used for indicating error conditions of the current change and update information; and the positioning module 630 is configured to perform the fusion positioning on the GPS positioning information and the dead reckoning position information in the current change and update information according to the fusion positioning manner in combination with the error information to obtain a current position of an object.

In an embodiment, the determining module 620 is further configured to perform odometer error processing on odometer data recorded by an odometer, and perform dead reckoning according to the current attitude change information after performing a speed update based on odometer data after the odometer error processing to obtain the dead reckoning position information, the attitude change information including speed information. The determining module 620 is further configured to update the attitude change information according to a rotation speed of a gyroscope and angular velocity increments successively acquired twice by the gyroscope; and perform dead reckoning according to the updated current attitude change information to obtain the dead reckoning position information. The determining module 620 is further configured to perform dead reckoning according to the current attitude change information after performing attitude alignment based on acceleration acquired by an accelerometer to obtain the dead reckoning position information. The determining module 620 is further configured to perform dead reckoning according to the current attitude change information after performing attitude alignment based on GPS azimuth and acceleration acquired by an accelerometer to obtain the dead reckoning position information.

In an embodiment, the determining module 620 is further configured to determine model input features based on the current change and update information; and input the model input features into a fusion positioning model obtained by training to determine the fusion positioning manner matching the current change and update information.

In an embodiment, the determining module 620 is further configured to perform the fusion positioning based on the fusion positioning manner at positioning moments in a preset time period from a current moment to determine positions corresponding to the positioning moments.

The positioning module 630 is further configured to perform the fusion positioning in the fusion positioning manner in a preset time period after matching a fusion positioning manner most recently before a current moment.

The fusion positioning manner includes a Kalman filter-based fusion positioning manner and a particle filter-based fusion positioning manner.

In an embodiment, the obtaining module 610 is further configured to obtain a preset quantity of sample change and update information; and separately perform, for each sample change and update information, the fusion positioning on the sample change and update information in fusion positioning manners in an initial fusion positioning model, and obtain fusion positioning performance parameters of the fusion positioning manners in which the fusion positioning is performed on the sample change and update information; and the determining module 620 is further configured to determine, based on the fusion positioning performance parameters, preferred fusion positioning manners corresponding to the sample change and update information from the fusion positioning manners; and determine a correspondence between the change and update information and the fusion positioning manners according to the preferred fusion positioning manners separately corresponding to the sample change and update information.

The determining module 620 is further configured to separately determine the preferred fusion positioning manners separately corresponding to the sample change and update information as classification results of sample fusion positioning manners corresponding to the sample change and update information; and determine the correspondence between the change and update information and the fusion positioning manners based on the sample change and update information and the corresponding classification results of the sample fusion positioning manners.

The determining module 620 is further configured to determine sample quantities of the sample change and update information corresponding to the preferred fusion positioning manners; determine a preferred fusion positioning manner corresponding to a sample quantity which has a largest value as a fusion positioning manner corresponding to the preset quantity of sample change and update information; and determine, based on the preset quantity of sample change and update information or the sample change and update information having the sample quantity which has a largest value, and classification results of the fusion positioning manners, a correspondence between the change and update information and the classification results of the fusion positioning manners.

The determining module 620 is further configured to determine the fusion positioning model based on the determined correspondence between the change and update information and the classification results of the fusion positioning manners in a case that a training ending condition is met; otherwise, update the initial fusion positioning model, and perform a next round of a training process.

Based on the above, according to various embodiments of the positioning apparatus, GPS positioning information and dead reckoning position information are obtained, and a matched fusion positioning manner and error information are determined. Then, fusion positioning is performed according to the matched fusion positioning manner and the error information to obtain a current positioned position, so that the matched fusion positioning manner can be classified dynamically to perform the fusion positioning, which can effectively improve precision of the fusion positioning and provide a relatively robust performance in different scenarios.

Figure 7:
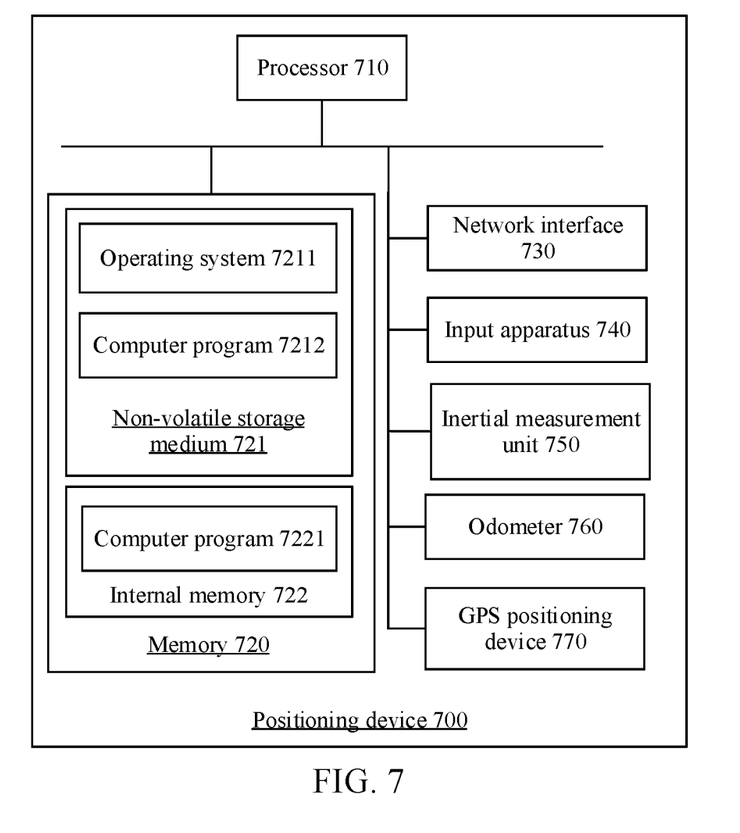
FIG. 7 is a diagram of an internal structure of a positioning device according to an embodiment.

In an embodiment, a positioning device 700 is provided. The positioning device 700 may be any device that can perform positioning according to inertial sensing parameters measured by an inertial measurement unit 750, such as a terminal or a server. The terminal may be any terminal that can perform inertial measurement, such as an in-vehicle navigation device. The server may be any server that can obtain the inertial sensing parameters measured by the inertial measurement unit 750, and perform the fusion positioning by using the inertial sensing parameters.

A diagram of an internal structure of a positioning device 700 according to an embodiment is shown in FIG. 7. The positioning device includes a processor 710, a memory 720 and a network interface 730 connected through a system bus. In a case that the positioning device is a terminal device, a display screen and an input apparatus 740 may be further included. In a case that the positioning device 700 is a device that can automatically measure the inertial sensing parameters such as an in-vehicle navigation device, devices such as an inertial measurement unit 750, a GPS positioning device 770, an accelerometer, and an odometer 760 connected by using the system bus may be further included.

The processor 710 of the positioning device is configured to provide computing and control capabilities. The memory 720 of the positioning device includes a non-volatile storage medium 721 and an internal memory 722. The non-volatile storage medium 721 stores an operating system 7211 and a computer program 7212. The internal memory 722 provides an environment for running of the operating system 7211 and the computer programs 7212 in the non-volatile storage medium 721 and a computer program 7221. The computer program may include program module or code forming the positioning apparatus, for example, obtaining module, determining module and positioning module shown in FIG. 6. The positioning methods according to the embodiments of the disclosure may be directly performed using a hardware processor, or may be performed by a combination of hardware and software modules. The software module may be stored in the non-volatile storage medium 721 located in the memory 710. The network interface 730 of the positioning device is configured to communicate with an external terminal through a network connection. The computer program is executed by the processor 710 to implement a positioning method according to the embodiments of the disclosure. The display screen of the positioning device may be a liquid crystal display (LCD) screen or an e-ink display screen. The input apparatus 740 of the positioning device may be a touch layer covering the display screen, or may be a button, a trackball, or a touchpad disposed on a housing of the positioning device, or may be an external keyboard, a touchpad, a mouse or the like.

A person skilled in the art may understand that, the structure shown in FIG. 7 is only an example block diagram of a partial structure according to an embodiment of the disclosure, and does not limit the inertial navigation device to which the solution of the disclosure is applied. Specifically, the specific inertial navigation device may include more components or fewer components than those shown in the figure, or some components may be combined, or a different component may be used.

Therefore, in an embodiment, an inertial navigation device is further provided, including a memory 720 and a processor 710, the memory 720 storing a computer program, and the computer program, when executed by the processor 710, performing the steps of the method in any one of the foregoing embodiments.

A person of ordinary skill in the art may understand that some or all of the foregoing embodiments may be implemented by a computer program instructing related hardware. The computer program may be stored in a non-volatile computer-readable storage medium, and when the program is executed, the procedures in the foregoing method embodiments may be implemented. Any reference to a memory, a storage, a database, or another medium used in the various embodiments provided in the disclosure may include a non-volatile and/or volatile memory. The non-volatile memory may include a ROM, a programmable ROM (PROM), an electrically programmable ROM (EPROM), an electrically erasable programmable ROM (EEPROM), or a flash. The volatile memory may include a RAM or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiment are described. However, the combinations of the technical features shall all be considered as falling within the scope of the disclosure provided that they do not conflict with each other.

The embodiments of the disclosure only show some example embodiments of the disclosure. A person of ordinary skill in the art may understand that modifications, substitutions and improvements may be made to the embodiments disclosed herein without departing from the spirit and scope of the disclosure, and the modifications, substitutions and improvements shall be construed as falling within the protection scope of the disclosure. Therefore, the protection scope of the patent of the disclosure shall be subject to the appended claims.

What is claimed is:

1. A positioning method, performed by a terminal, the method comprising:
    obtaining update information of an object, the update information comprising GPS positioning information and dead reckoning position information, the dead reckoning position information being determined according to attitude change information of the object measured by an inertial measurement unit (IMU);
    determining a fusion positioning model matching the update information, the fusion positioning model being used for performing fusion positioning using the update information;
    determining error information of the update information, the error information indicating error conditions of the update information; and
    performing the fusion positioning on the GPS positioning information and the dead reckoning position information of the update information according to the fusion positioning model with the error information to obtain a current position of the object.

2. The method according to claim 1, wherein the determining the dead reckoning position information comprises:
    performing an odometer error processing on odometer data recorded by an odometer and a speed update on the odometer data, and performing dead reckoning according to the attitude change information, the attitude change information comprising speed information of the object;
    updating the attitude change information according to a rotation speed and angular velocity increments successively acquired by a gyroscope, and performing dead reckoning to the updated attitude change information;
    performing an attitude alignment based on acceleration measured by an accelerometer and performing dead reckoning according to the attitude alignment; and
    performing the attitude alignment based on GPS azimuth and the acceleration acquired by the accelerometer.

3. The method according to claim 1, wherein the determining the fusion positioning model matching the update information comprises:
    determining model input features based on the update information; and
    inputting the model input features into the fusion positioning model obtained by training.

4. The method according to claim 1, the method further comprises:
    performing the fusion positioning based on the fusion positioning model at positioning moments in a preset time period from a current moment to determine positions corresponding to the positioning moments.

5. The method according to claim 1, wherein the determining the fusion positioning model matching the update information further comprises:
    performing the fusion positioning based on the fusion positioning model in a preset time period after matching the fusion positioning model and at a first moment before a current moment, the first moment being the closest moment among a plurality of moments from the current moment.

6. The method according to claim 1, wherein
    the fusion positioning model comprises at least one of a Kalman filter-based fusion positioning algorithm or a particle filter-based fusion positioning algorithm.

7. The method according to claim 3, wherein the inputting the model input features into the fusion positioning model obtained by training further comprises:
    obtaining a preset quantity of sample update information;
    separately performing, for each of the sample update information, the fusion positioning on the sample update information with an initial fusion positioning model, and obtaining fusion positioning performance parameters based on the sample update information;
    obtaining, based on the fusion positioning performance parameters, sample fusion positioning models corresponding to the sample update information; and
    determining a correspondence between the update information and each of the sample fusion positioning models.

8. The method according to claim 7, wherein the determining the correspondence between the update information and each of the sample fusion positioning models further comprises:
    separately determining the fusion positioning model corresponding to each of the sample update information as classification results of sample fusion positioning models; and
    determining the correspondence between the update information and the fusion positioning models based on the sample update information and the corresponding classification results of the sample fusion positioning models.

9. The method according to claim 7, wherein the determining the correspondence between the update information and the fusion positioning models further comprises:
    determining sample quantities of the sample update information corresponding to each of the sample fusion positioning models; and determining the fusion positioning model among the sample fusion positioning models based on a sample quantity corresponding to one of the sample fusion positioning models having the largest sample quantity.

10. The method according to claim 7, wherein the determining the correspondence between the update information and the classification results of the sample fusion positioning models further comprises:
determining the fusion positioning model based on the determined correspondence between the update information and classification results of the sample fusion positioning models based on one of the sample fusion positioning models satisfying a training ending condition; or
updating the initial fusion positioning model and performing a next round of a training process.

11. A positioning apparatus, comprising:
at least one memory configured to store computer program code;
at least one processor configured to access the at least one memory and operate as instructed by the computer program code, the computer program code comprising:
obtaining code configured to cause the at least one processor to obtain update information of an object, the update information comprising GPS positioning information and dead reckoning position information, the dead reckoning position information being determined according to attitude change information of the object measured by an inertial measurement unit (IMU);
determining code configured to cause the at least one processor to:
determine a fusion positioning model matching the update information, the fusion positioning model being used for performing fusion positioning using the update information, and
determine error information according to the current change and update information, the error information being used for indicating error conditions of the current change and update information; and
positioning code configured to cause the at least one processor to perform the fusion positioning on the GPS positioning information and the dead reckoning position information of the update information according to the fusion positioning model with the error information to obtain a current position of the object.

12. The apparatus according to claim 11, wherein the determining code is further configured to cause the at least one processor to:
perform an odometer error processing on odometer data recorded by an odometer and a speed update on the odometer data, and perform dead reckoning according to the attitude change information, the attitude change information comprising speed information of the object;
update the attitude change information according to a rotation speed and angular velocity increments successively acquired by a gyroscope; and perform dead reckoning to the updated attitude change information;
perform an attitude alignment based on an acceleration measured by an accelerometer and perform dead reckoning according to the attitude alignment; and
perform the attitude alignment based on GPS azimuth and the acceleration acquired by the accelerometer.

13. The apparatus according to claim 11, wherein the determining code is further configured to cause the at least one processor to:

determine model input features based on the update information; and
input the model input features into the fusion positioning model obtained by training.

14. The apparatus according to claim 11, wherein the determining code is further configured to cause the at least one processor to perform the fusion positioning based on the fusion positioning model at positioning moments in a preset time period from a current moment to determine positions corresponding to the positioning moments.

15. The apparatus according to claim 11, wherein the positioning code is further configured to cause the at least one processor to perform the fusion positioning based on the fusion positioning model in a preset time period after matching the fusion positioning model and at a first moment before a current moment, the first moment being the closest moment among a plurality of moments from the current moment.

16. The apparatus according to claim 11, wherein
the fusion positioning model comprises at least one of a Kalman filter-based fusion positioning algorithm or a particle filter-based fusion positioning algorithm.

17. The apparatus according to claim 13, wherein the obtaining code is further configured to cause the at least one processor to:
obtain a preset quantity of sample update information; and
separately perform, for each of the sample update information, the fusion positioning on the sample update information with an initial fusion positioning model, and obtain fusion positioning performance parameters based on the sample update information, and
wherein the determining code is further configured to cause the at least one processor to:
obtain, based on the fusion positioning performance parameters, sample fusion positioning models corresponding to the sample update information; and
determine a correspondence between the update information and each of the sample fusion positioning models.

18. The apparatus according to claim 17, wherein the determining code is further configured to cause the at least one processor to:
separately determine the fusion positioning model corresponding to each of the sample update information as classification results of sample fusion positioning models; and
determine the correspondence between the update information and the fusion positioning models based on the sample update information and the corresponding classification results of the sample fusion positioning models.

19. The apparatus according to claim 17, wherein the determining code is further configured to cause the at least one processor to:
determine sample quantities of the sample update information corresponding to each of the sample fusion positioning models; and
determine the fusion positioning model among the sample fusion positioning models based on a sample quantity corresponding to one of the sample fusion positioning models having the largest sample quantity.

20. A non-transitory computer-readable storage medium storing computer program code to cause at least one processor to:
obtain update information of an object, the update information comprising GPS positioning information and dead reckoning position information, the dead reckoning position information being determined according to attitude change information of the object measured by an inertial measurement unit (IMU);

determine a fusion positioning model matching the update information, the fusion positioning model being used for performing fusion positioning using the update information;

determine error information of the update information, the error information indicating error conditions of the update information; and perform the fusion positioning on the GPS positioning information and the dead reckoning position information of the update information according to the fusion positioning model with the error information to obtain a current position of the object.

* * * * *